(12) United States Patent
Troyanova et al.

(10) Patent No.: US 7,120,574 B2
(45) Date of Patent: Oct. 10, 2006

(54) SYNONYM EXTENSION OF SEARCH QUERIES WITH VALIDATION

(75) Inventors: Galina Troyanova, Minsk (BY); Andrei Bondarenko, Arlington, MA (US); Yaraslau Bialiauski, Malden, MA (US); Igar Zhygalka, Minsk (BY)

(73) Assignee: Invention Machine Corporation, Boston, MA (US)

( * ) Notice: Subject to any disclaimer, the term of this patent is extended or adjusted under 35 U.S.C. 154(b) by 889 days.

(21) Appl. No.: 09/841,698

(22) Filed: Apr. 24, 2001

(65) Prior Publication Data

US 2002/0022955 A1    Feb. 21, 2002

Related U.S. Application Data

(63) Continuation-in-part of application No. 09/541,182, filed on Apr. 3, 2000, now abandoned.

(60) Provisional application No. 60/199,659, filed on Apr. 25, 2000, provisional application No. 60/199,920, filed on Apr. 26, 2000, provisional application No. 60/199,658, filed on Apr. 25, 2000, provisional application No. 60/199,921, filed on Apr. 26, 2000.

(51) Int. Cl.
*G06F 17/27* (2006.01)

(52) U.S. Cl. ............. 704/9; 704/1; 704/10; 707/3

(58) Field of Classification Search ............ 704/1, 704/4, 7, 9, 10; 707/1–5
See application file for complete search history.

(56) References Cited

U.S. PATENT DOCUMENTS

| | | | |
|---|---|---|---|
| 4,688,195 A | 8/1987 | Thompson et al. | |
| 4,829,423 A | 5/1989 | Tennant et al. | |
| 4,864,502 A | 9/1989 | Kucera et al. | |
| 4,868,750 A | 9/1989 | Kucera et al. | |
| 4,887,212 A | 12/1989 | Zamora et al. | |
| 5,060,155 A | 10/1991 | van Zuijlen | |
| 5,146,405 A | 9/1992 | Church | |
| 5,146,406 A | 9/1992 | Jensen | |
| 5,237,502 A | 8/1993 | White et al. | |
| 5,331,556 A | 7/1994 | Black, Jr. et al. | |
| 5,369,575 A | 10/1994 | Lamberti et al. | |
| 5,377,103 A | 12/1994 | Lamberti et al. | |
| 5,394,509 A | 2/1995 | Winston | |
| 5,404,295 A | 4/1995 | Katz et al. | |
| 5,418,948 A | 5/1995 | Turtle | |
| 5,424,947 A | 6/1995 | Nagao et al. | |
| 5,488,725 A | 1/1996 | Turtle et al. | |
| 5,519,608 A | 5/1996 | Kupiec | |
| 5,559,940 A | 9/1996 | Hutson | |
| 5,614,899 A | 3/1997 | Tokuda et al. | |
| 5,630,121 A | 5/1997 | Braden-Harder et al. | |
| 5,634,051 A | 5/1997 | Thompson | |

(Continued)

OTHER PUBLICATIONS

Klavans et al., Role of Verbs in Document Analysis, Aug. 1998, , Columbia University, pp. 680-686.*

(Continued)

*Primary Examiner*—Richemond Dorvil
*Assistant Examiner*—Lamont Spooner
(74) *Attorney, Agent, or Firm*—Mills & Onello, LLP

(57) ABSTRACT

A computer search involves expanding a user query with two synonym dictionaries—actions and object—and then validating the expanded queries by comparison with entries in a Subject-Action-Object Knowledge Database (SAO KB) in a discipline corresponding to the query. The latter is prepared from natural language texts and contains fields with subjects, actions, objects, and "main parts of objects" extracted from the object.

22 Claims, 4 Drawing Sheets

U.S. PATENT DOCUMENTS

| | | | |
|---|---|---|---|
| 5,642,502 | A | 6/1997 | Driscoll |
| 5,694,592 | A | 12/1997 | Driscoll |
| 5,696,916 | A | 12/1997 | Yamazaki et al. |
| 5,696,962 | A | 12/1997 | Kupiec |
| 5,724,571 | A | 3/1998 | Woods |
| 5,761,497 | A | 6/1998 | Holt et al. |
| 5,799,268 | A | 8/1998 | Boguraev |
| 5,802,493 | A | 9/1998 | Sheflott et al. |
| 5,802,504 | A | 9/1998 | Suda et al. |
| 5,844,798 | A | 12/1998 | Uramoto |
| 5,873,056 | A | 2/1999 | Liddy et al. |
| 5,873,076 | A | 2/1999 | Barr et al. |
| 5,878,385 | A | 3/1999 | Bralich et al. |
| 5,884,302 | A | 3/1999 | Ho |
| 5,893,104 | A | 4/1999 | Srinivasan et al. |
| 5,895,464 | A | 4/1999 | Bhandari et al. |
| 5,895,466 | A * | 4/1999 | Goldberg et al. ............. 707/5 |
| 5,933,822 | A | 8/1999 | Braden-Harder et al. |
| 6,076,051 | A | 8/1999 | Messerly et al. |
| 5,963,940 | A | 10/1999 | Liddy et al. |
| 5,966,686 | A | 10/1999 | Heidorn et al. |
| 5,995,922 | A | 11/1999 | Penterouodakis et al. |
| 6,026,388 | A | 2/2000 | Liddy et al. |
| 6,038,560 | A | 3/2000 | Wical |
| 6,101,492 | A | 8/2000 | Jacquemin et al. |
| 6,161,084 | A * | 12/2000 | Messerly et al. ............. 704/9 |
| 6,246,977 | B1 * | 6/2001 | Messerly et al. ............. 704/9 |
| 6,269,329 | B1 * | 7/2001 | Nordstrom ................... 704/1 |
| 6,523,028 | B1 * | 2/2003 | DiDomizio et al. .......... 707/5 |
| 6,901,399 | B1 * | 5/2005 | Corston et al. ............... 707/6 |
| 2002/0165862 | A1 * | 11/2002 | Richards et al. ............. 707/9 |

OTHER PUBLICATIONS

Miller et al., Introduction to WordNet: An On-line Lexical Database, Aug. 1993, pp. 1-86.*

Mihalcea et al., A Method for Word Sense Disambiguation of Unrestricted Text, Jun. 1999, pp. 152-158.*

Arampatzis et al., IRENA: Information Retrieval Engine based on Natural language Analysis, 1997, Proceedings of RIAO, p. 159-175.*

"A Non-projective Dependency Parser", Fifth Conference on Applied Natural Language Processing, Mar. 31-Apr. 3, 1997, Association for Computational Linguistics.

Software Agents, AAAI Press/The MIT Press, 1997, Chapter10-Lifelike Computer Characters: The Persona Project at Microsoft, Gene Ball, Dan Ling, David Kurtander, John Miller, David Pugh, Tim Skelly, Andy Stankosky, Davis Thiel, Maarten Van Dantzich, and Trace Wax.

Software Agents, AAAI Press/The MIT Press, 1997, Chapter 12—The M System, Doug RieckenSoftware Agents, AAAI Press/The MIT Press, 1997, Chapter 12—The M System, Doug Riecken.

Amble T., "BusTUC-A Natural Language Bus Route Oracle", Proceedings of the 6th Applied Natural Language Processing Conference, pp. 1-6, Apr. 29-May 4, 2000.

Radev D.R. et al. "Ranking Suspected Answers to Natural Language Question Using Predictive Annotation", Proceedings of the 6th Applied Natural Language Processing Conference, pp. 150-157, Apr. 29-May 4, 2000.

Srihari R. et al. "A Question Answering System Supported by Information Extraction", Proceedings of the 6th Applied Natural Language Processing Conference, pp. 166-172, Apr. 29-May 4, 2000.

Cardie C. et al. "Examing the Role of Statistical and Linguistic Knowledge Sources in a General-Knowledge Question-Answering System", Proceedings of the 6th Applied Natural Language Processing Conference, pp. 180-187, Apr. 29-May 4, 2000.

Woods W.A. et al. "Linguistic Knowledge Can Improve Information Retrieval", Proceedings of the 6th Applied Natural Language Processing Conference, pp. 262-267, Apr. 29-May 4, 2000.

* cited by examiner

SYNONYM EXTENSION OF SEARCH QUERIES WITH VALIDATION

RELATED APPLICATIONS

This is a continuation-in-pat of copending U.S. patent application Ser. No. 60/199,659 filed Apr.25, 2000 and copending U.S. patent application Ser. No. 60/199,920 filed Apr. 26, 2000. This application is related to copending U.S. patent application Ser. No.60/199,658 filed Apr. 25, 2000 and copending U.S. patent application Ser. No. 60/199,921 filed Apr. 26, 2000. This application is also related to copending U.S. patent application Ser. No. 09/541,192 filed Apr.3, 2000, which is a continuation application of copending U.S. patent application Ser. No. 09/345,547, filed Jun. 30, 1999 which is a continuation-in-part of copending U.S. patent application Ser. No. 09/321,804 filed May 27, 1999. These applications are herewith incorporated herein by reference.

FIELD OF THE INVENTION

This invention relates to computer based search systems, and particularly to narrowing searches for the user's convenience.

BACKGROUND OF THE INVENTION

Usually computer-based document-search processors use keywords. The result of a keyword search is often an enormous amount of information, the majority of which is irrelevant to user's requirements.

The precision of a search can be increased, if the user formulates the query as a problem, for example, "produce aluminum layer", or "heat water", or "oxidize silicon wafer". But such formulations severely decrease the quantity of found information because the search will not find expressions such as "form Al layer" that are similar to "produce aluminum layer", or expressions such as "increase temperature of water" that are similar to "heat water", or expressions such as "perform oxidation of silicon substrate" that are similar to "oxidize silicon wafer".

It is possible to provide a complete and more exact search with help of a dictionary of search synonyms e.g. in the form of Al layer=produce aluminum layer . . . , etc. But estimates show that volume of entries in such a dictionary would be huge—more than $10^7$ expressions to describe different problems in just technical fields. Expansion into other (nontechnical) disciplines will lead to multiple expansion of this dictionary (up to $10^{11}$ expressions).

An object of the invention is to improve search systems.

SUMMARY OF EMBODIMENTS OF THE INVENTION

An embodiment of the invention involves expanding the user query with help of two synonym dictionaries-actions and object, and then validating every result from the obtained queries with help of a Subject-Action-Object Knowledge Database (SAO KB), containing fields with subjects, actions, objects, and "main parts of objects" extracted from the object. The SAO KB is prepared from natural language texts with the help of a semantic processor such as that disclosed in U.S. Pat. No. 6,167,370.

These and other embodiments, objects, and advantages of the invention will become evident from the following description of exemplary embodiments when read in light of the accompanying drawings.

DETAILED DESCRIPTION OF PREFERRED EMBODIMENTS

The following are incorporated herein by reference:

I. System and on-line information service presently available at www.cobrain.com and the publicly available user manual therefor.

II. The software product presently marketed by Invention Machine Corporation of Boston, Mass., USA, under it's trademark "KNOWLEDGIST" and the publicly available user manual therefor.

III. U.S. Pat. No. 6,167,370.

IV. U.S. patent application Ser. No. 09/541,182 filed Apr. 3, 2000.

V. The software product presently marketed by Invention Machine Corporation of Boston, Mass., USA under its Trademark "TECHOPTIMIZER" and the publicly available user manual therefor.

VI. U.S. Pat. No. 5,901,068.

Figure 1:
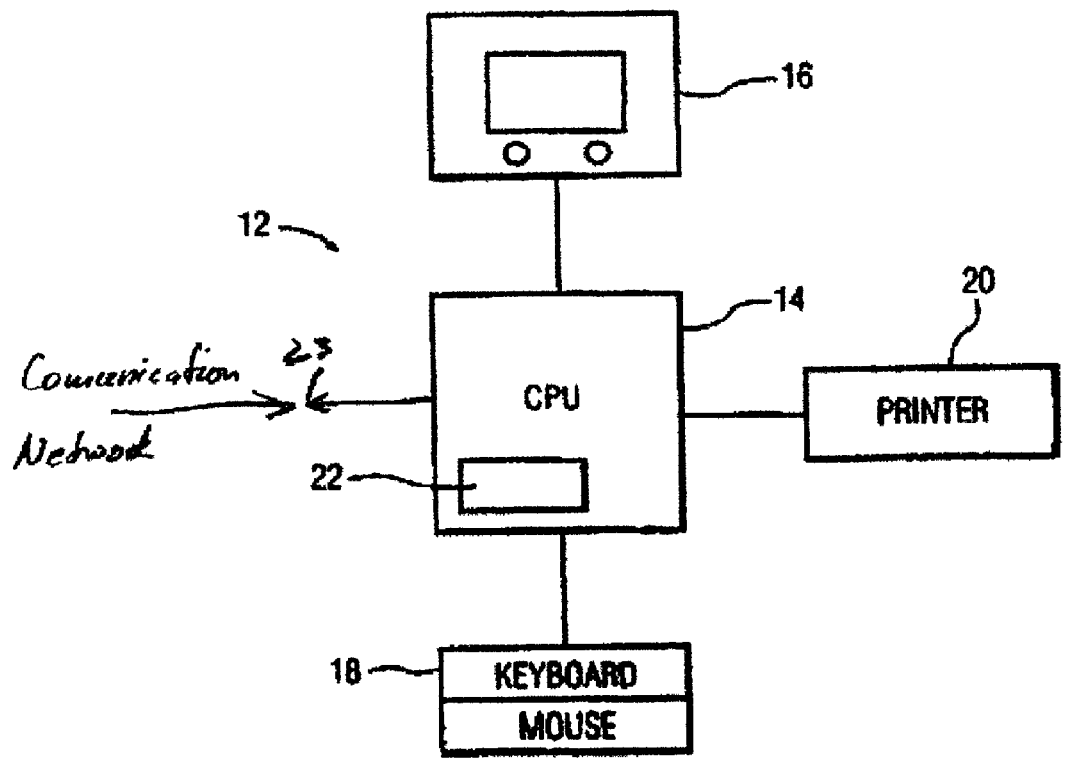
FIG. 1 is a block diagram of a system using a software program and embodying the invention.

In FIG. 1 a preferred software system and method embodying the invention is in the form of a program. The program resides in a personal computer 12 that includes a CPU 14, a monitor 16, a keyboard/mouse 18, and a printer 20 and is in the form of a program. The program may be stored on a portable disk and inserted in a disk reader slot 22 or on a fixed disc in the computer or on a ROM. According to another embodiment the program resides on a server and the user accesses the program with a standard communication port 23 over a communications network via LAN, WAN, or the Internet. The port 23 also serves for accessing information from databases on the Internet. Computer 12 can be conventional and be of any suitable make or brand. A printer 20 provides a hard copy of a session where desired. Other peripherals and modem/network interfaces are provided as desired.

Figure 2:
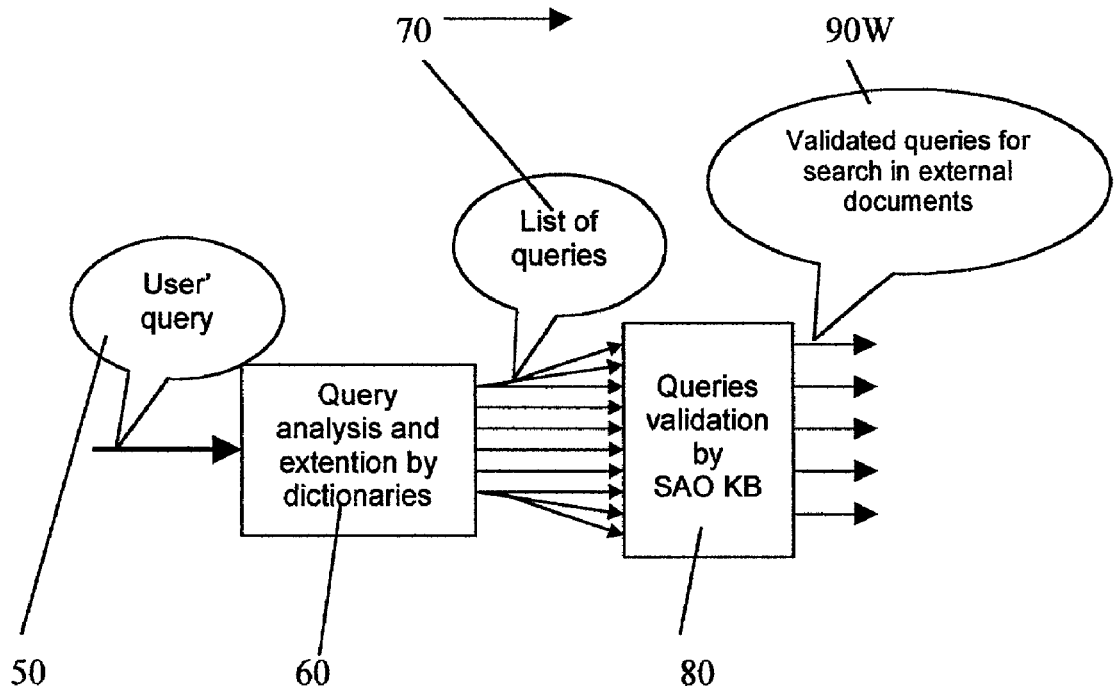
FIG. 2 is a flow chart illustrating the operation of the program embodying the invention.

FIG. 2 is a flowchart illustrating the operation of an embodiment. Here a user's query 50 passes to a query analysis and extension phase 60 to produce a list of queries 70. A queries validation unit 80 using an SAO KB validates the query list to produce a desired list of validated queries 90 for search in external documents.

Figure 3:
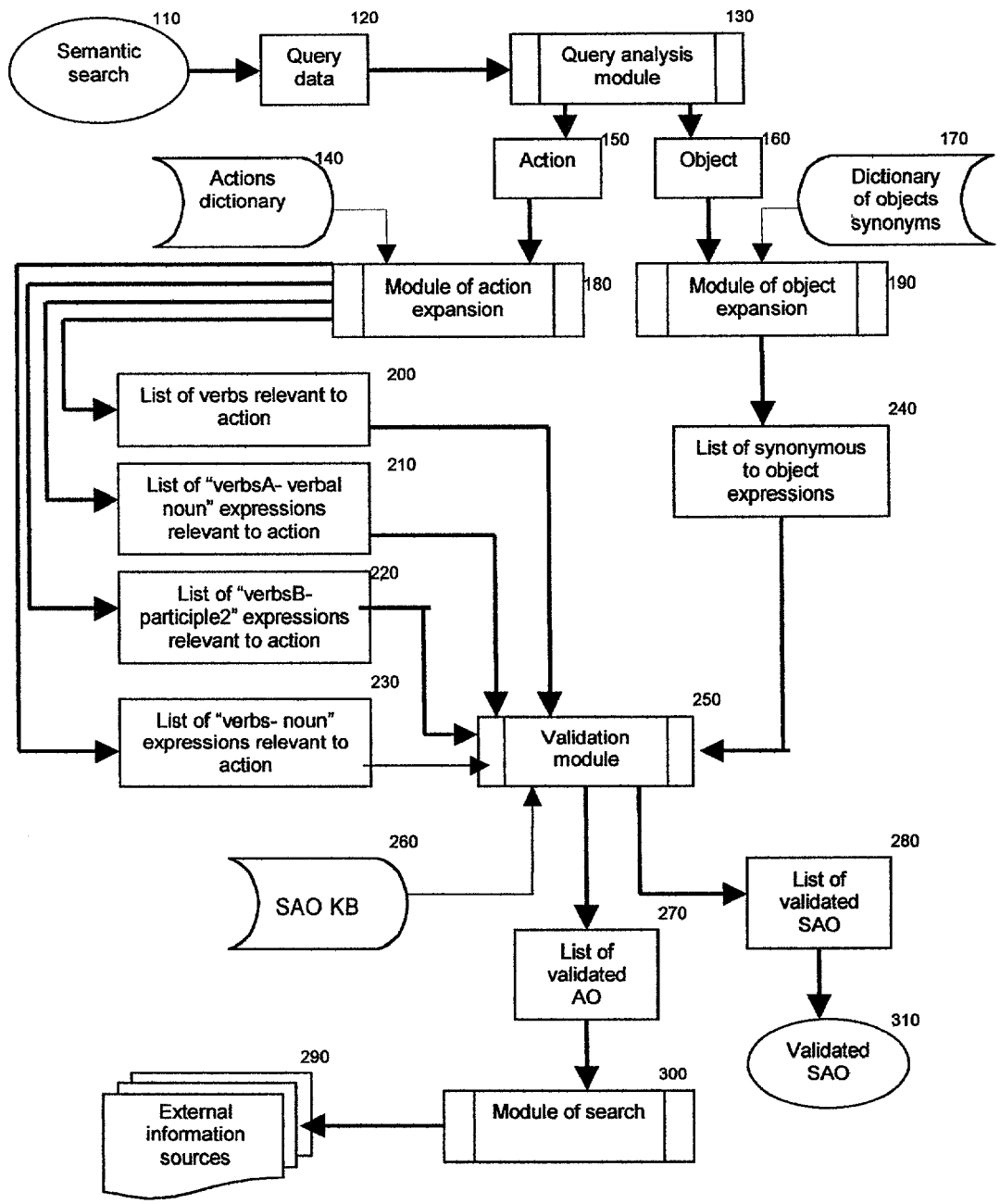
FIG. 3 is a more detailed flowchart illustrating the operation of the program.
Figure 4:
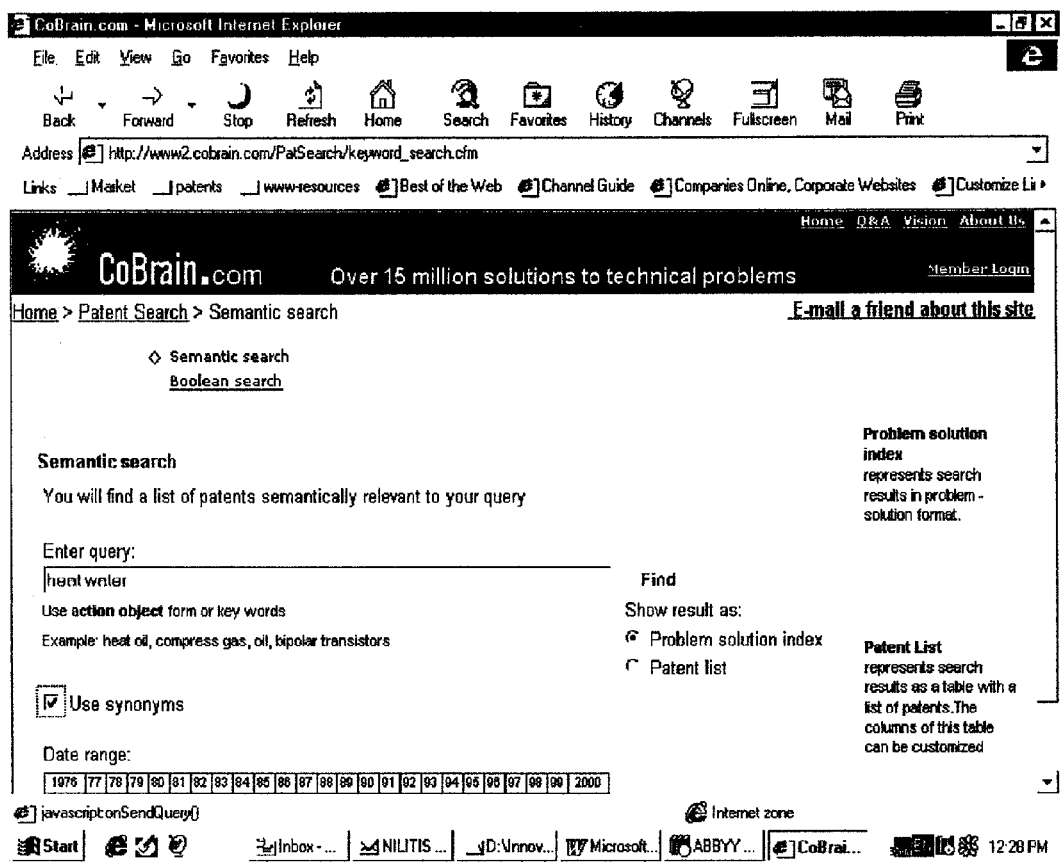
FIG. 4 is a view of a screen in a monitor depicting the program and inviting entry of a query.

A more detailed diagram of query extension appears in FIG. 3. Here, the program invites a user to enter a query 110 on a semantic search screen of a monitor 16 as shown in FIG. 4. The user' query data 120 passes to query analysis module 130. Query analysis module 130 divides the user's query data 120 into action data 150 and object data 160. The simplest method of such division relies on list of verbs. For example, we can extract action "heat" from an initial query: "heat aluminum layer", because "heat" is present in the list of verbs; the remainder of query: "aluminum layer" is then recognized as an object.

Action data 150 are transmitted to module 180 of action expansion (or action expansion module). Action expansion is accomplished on the basis of an action dictionary 140, containing the six parts:

List of verbs divided into groups, containing the verbs with similar sense (heat-warm, produce-create-generate, etc.);

List of "verb-nouns" expressions synonymous with other verb (heat-increase temperature-rise temperature, etc.)

List of "verbsA" including the verbs-perform, carry out, realize, and other verbs with similar sense;

List of "nouns" including the following groups—"verb-relevant verbal noun" (heat-heating; produce-production, etc.)

List of "verbsB" including the verbs—produce, create, form, and other verbs of similar sense;

List of "participle2" including the following groups—"verb-relevant participle2" (heat-heated; produce-produced, etc.).

The action expansion module 180 forms four lists from action module 150 and actions dictionary 140:

List of verbs relevant to action in module 200;

List of "verbsA-verbal noun" expressions relevant to action in module 210;

List of "verbsB-participle2" expressions relevant to action in module 220;

List of "verb-noun" expressions relevant to action in module 230.

For example, module 180 takes the action "heat" and forms the following lists:

List of verbs relevant to action in module 200—"heat, warm";

List of "verbsA-verbal noun" expressions relevant to action in module 210—"perform—heating", "carry out—heating", "realize—heating", etc.;

List of "verbsB-participle2" expressions relevant to action in module 220 —"produce—heated", "create—heated", "form—heated", and etc.

List of "verb-noun" expressions relevant to action in module 230—"increase-temperature", rise—temperature", and etc.

The object data 160 pass to the module 190 of object expansion (or object expansion module 190). Object expansion is accomplished on basis of a dictionary of object synonyms 170, containing groups of objects having similar sense (aluminum layer—Al layer, laser radiation—coherent radiation, etc.).

The object expansion module 190 forms lists of expressions synonymous with the objects in module 240 from the objects in module 160 and a dictionary of object synonyms in module 170. For example, object expansion in module 190 uses the object "aluminum layer" to form the following list: aluminum layer, Al layer, aluminium layer, etc.

All the lists in modules 200, 210, 220, 230, and 240 are transmitted into validation module 250. A validation module 250 forms search queries from the lists in modules 200, 210, 220, 230, and 240 and accomplishes the search in an SAO KB 260 according to these queries.

The SAO KB 260 is prepared from natural language texts with help of a semantic processor as described in the aforementioned U.S. patent application Ser. No. 09/345,547 filed Apr.3, 2000 (Reference IV above) as well as in U.S. Pat. No. 6,167,370 (Reference III above). The SAO KB 260 contains the following fields: subjects, actions, objects, and "main parts of objects" extracted from the object. For example, the semantic processor converts the sentence: "A thin aluminum layer is heated by reflected laser radiation" into following fields of the SAO KB 260:

Subject—"reflected laser radiation";
Action—"heat";
Object—"thin aluminum layer";
Main part of object—"aluminum layer";

The volume of entries in the SAO KB 260 should be about $10^6$ SAOs or more. The natural language texts can belong to various disciplines such as (science, engineering, culture, business, etc.). A customized SAO KB can also be used. Texts for a customized SAO KB should be selected from a single discipline. If the user query and customized SAO KB belong to similar disciplines, query expansion will be more complete and precise. According to an embodiment the SAO KB 260 is prepared from natural language texts in a specific discipline or a group of related disciplines.

Validation module 250 performs search queries according to the following rules. Here the sequence is not relevant although all are performed:

1) [All verbs from list of verbs relevant to action 200 through OR] AND [all expressions from list of synonymous to object expressions 240 through OR];

the search of verbs is accomplished in the "action" field of the SAO KB 260, and search of expressions from list of synonymous to object expressions is accomplished in "main part of object" field of SAO KB 260;

2) [All verbs from list of "verbsA" through OR] AND [all nouns from list of "verbsA-verbal noun"expressions relevant to action 210 through OR] AND [all expressions from list of synonymous to object expressions 240 through OR];

the search of verbs is accomplished in the "action" field of the SAO KB 260, search of verbal nouns from "verbsA-verbal noun" expressions is accomplished in the "main part of object" field of the SAO KB 260; and search of expressions from list of synonymous to object expressions is accomplished in the "object" field of SAO KB 260;

3) [All verbs from list of "verbsB" through OR] AND [all participles2 from list of "verbsB-participle2" expressions relevant to action 220 through OR] AND [all expressions from list of synonymous to object expressions 240 through OR];

the search of verbs is accomplished in the "action" field of the SAO KB 260, the search of participles2 from list of "verbsB-participle2" expressions is accomplished in the "object" field of SAO KB; and the search of expressions from the list of synonymous to object expressions is accomplished in the "main part of object" field of the SAO KB.

4) [All verbs from list of "verb-noun" expressions relevant to action 230 through OR] AND [all nouns from list of "verbs-noun" expressions relevant to action 230 through OR] AND [all expressions from list of synonymous to object expressions 240 through OR];

the search of verbs is accomplished in the "action" field of the SAO KB 260, the search of nouns from the "verbs-noun" expressions is accomplished in the "main part of object" field of the SAO KB; and search of expressions from list of synonymous to object expressions is accomplished in the "object" field of the SAO KB 260;

For example, it is possible to obtain the following search queries from "heat aluminum layer" (for simplification, not all the verbs and expressions from the dictionaries are used):

{[heat OR warm] in "action" field of SAO KB} AND {[aluminum layer OR Al layer] in "main part of object" field of SAO KB};

{[perform OR realize] in "action" field of SAO KB} AND {[heating] in "main part of object" field of SAO KB} AND {[aluminum layer OR Al layer] in "object" field of SAO KB};

{[produce OR create] in "action" field of SAO KB} AND {[aluminum layer OR Al layer] in "main part of object" field of SAO KB} AND {[heated] in "object" field of SAO KB};

{[increase OR rise] in "action" field of SAO KB} AND {[temperature] in "main part of object" field of SAO KB} AND {[aluminum layer OR Al layer] in "object" field of SAO KB}.

Figure 5:
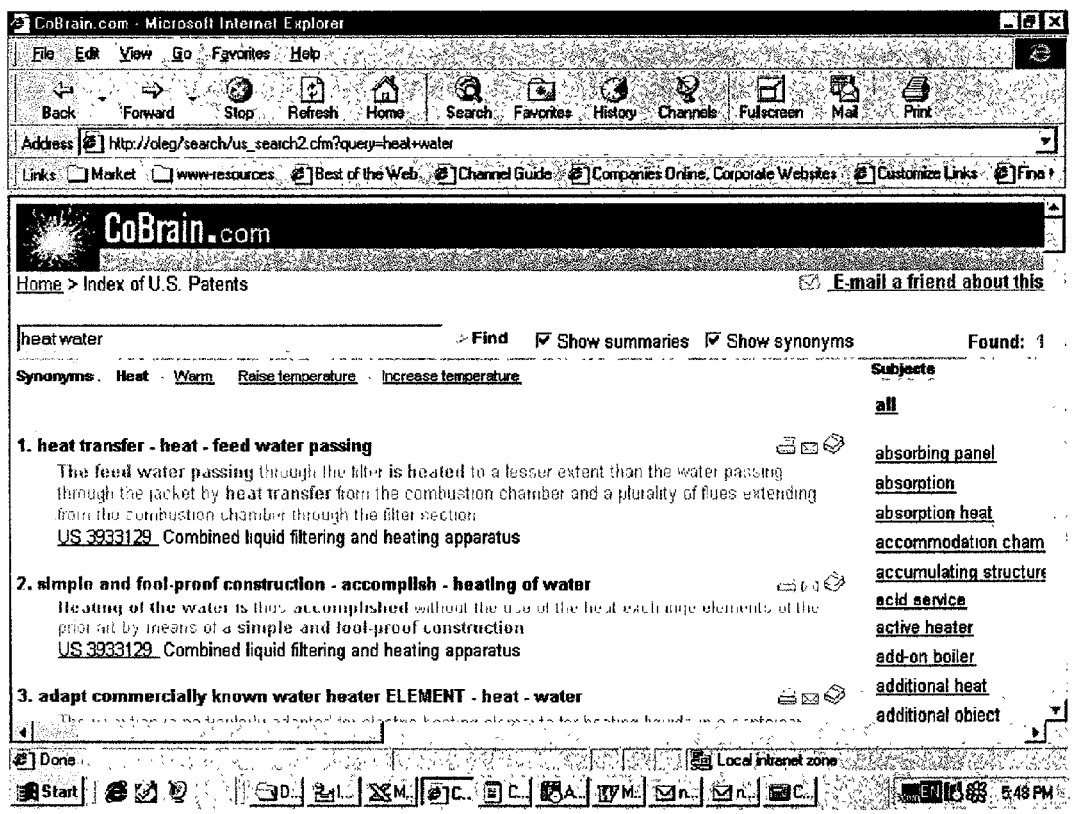
FIG. 5 is a view of a screen in a monitor depicting the program and inviting entry of a query.

The search queries are used by validation module 250 for searching in SAO KB 260. The module 250 counts the quantity of found SAOs for every query. If an SAO isn't found, the query is considered non-valid. Then the validation module 250 forms the list of validated SAOs 280 comprising the SAOs found according to the above-mentioned queries in SAO KB 260. Module 310 shows the user validated SAOs, as illustrated in FIG. 5 which is a view of a screen displaying data from the program.

Furthermore, the validation module 250 can form the list of validated AOs (action-object) 270 from the list of validated SAOs 280. For that, module 250 removes subjects from all validated SAOs and all words from objects, except those contained in search queries. A list of validated AOs 270 can be used in module 300 of search (or search module 300) for searching external information sources 290.

Two examples (for simplification, using only the actions dictionary; with the volume of an SAO KB=$5 \times 10^6$ SAOs) are shown in following table.

| Queries after expansion | | Results of search in SAO KB with frequencies | | | Queries after validation | |
|---|---|---|---|---|---|---|
| User query - form magnetic film. | | | | | | |
| Form | Magnetic Film | Form | Magnetic Film | 3724 | Form | Magnetic Film |
| Produce | Magnetic Film | Produce | Magnetic Film | 262 | Produce | Magnetic Film |
| Obtain | Magnetic Film | Obtain | Magnetic Film | 220 | Obtain | Magnetic Film |
| Provide | Magnetic Film | Provide | Magnetic Film | 211 | Provide | Magnetic Film |
| Make | Magnetic Film | Make | Magnetic Film | 126 | Make | Magnetic Film |
| Grow | Magnetic Film | Grow | Magnetic Film | 87 | Grow | Magnetic Film |
| Fabricate | Magnetic Film | Fabricate | Magnetic Film | 42 | Fabricate | Magnetic Film |
| Give | Magnetic Film | Give | Magnetic Film | 42 | Give | Magnetic Film |
| Create | Magnetic Film | Create | Magnetic Film | 24 | Create | Magnetic Film |
| Manufacture | Magnetic Film | Manufacture | Magnetic Film | 15 | Manufacture | Magnetic Film |
| Prepare | Magnetic Film | Prepare | Magnetic Film | 14 | Prepare | Magnetic Film |
| Generate | Magnetic Film | Generate | Magnetic Film | 11 | Generate | Magnetic Film |
| Synthesize | Magnetic Film | Synthesize | Magnetic Film | 6 | Synthesize | Magnetic Film |
| Emit | Magnetic Film | | Magnetic Film | 0 | | |
| Radiate | Magnetic Film | | Magnetic Film | 0 | | |
| Give Off | Magnetic Film | | Magnetic Film | 0 | | |
| Emanate | Magnetic Film | | Magnetic Film | 0 | | |
| Construct | Magnetic Film | | Magnetic Film | 0 | | |
| Yield | Magnetic Film | | Magnetic Film | 0 | | |
| Acquire | Magnetic Film | | Magnetic Film | 0 | | |
| Derive | Magnetic Film | | Film | 0 | | |
| User query - produce laser radiation | | | | | | |
| Form | Laser Radiation | Emit | Laser Radiation | 834 | Emit | Laser Radiation |
| Produce | Laser Radiation | Generate | Laser Radiation | 271 | Generate | Laser Radiation |
| Obtain | Laser Radiation | Produce | Laser Radiation | 173 | Produce | Laser Radiation |
| Provide | Laser Radiation | Provide | Laser Radiation | 81 | Provide | Laser Radiation |
| Make | Laser Radiation | Form | Laser Radiation | 19 | Form | Laser Radiation |
| Grow | Laser Radiation | Make | Laser Radiation | 10 | Make | Laser Radiation |
| Fabricate | Laser Radiation | Radiate | Laser Radiation | 9 | Radiate | Laser Radiation |
| Give | Laser Radiation | Obtain | Laser Radiation | 5 | Obtain | Laser Radiation |
| Create | Laser Radiation | Yield | Laser Radiation | 5 | Yield | Laser Radiation |
| Manufacture | Laser Radiation | | Laser Radiation | 0 | | |
| Prepare | Laser Radiation | | Laser Radiation | 0 | | |
| Generate | Laser Radiation | | Laser Radiation | 0 | | |
| Synthesize | Laser Radiation | | Laser Radiation | 0 | | |
| Emit | Laser Radiation | | Laser Radiation | 0 | | |
| Radiate | Laser Radiation | | Laser Radiation | 0 | | |
| Give Off | Laser Radiation | | Laser Radiation | 0 | | |
| Emanate | Laser Radiation | | Laser Radiation | 0 | | |
| Construct | Laser Radiation | | Laser Radiation | 0 | | |
| Yield | Laser Radiation | | Laser Radiation | 0 | | |
| Acquire | Laser Radiation | | Laser Radiation | 0 | | |
| Derive | Laser Radiation | | Laser Radiation | 0 | | |

Results with zero frequencies are deleted. These examples show that use of validation based on the SAO KB 260 provides an exact and relevant expansion of a user query. At the same time, used dictionaries have acceptable values.

The invention refines a synonym expansion of a user query by comparison of automatically generated set of synonym queries in the form "action-object" with actually existing "action-object" relations of an SAO KB. This results in a set of relevant synonyms for queries to provide exact and complete search results It will be understood that various other display symbols, emblems, colors, and configurations can be used instead of those disclosed for the exemplary embodiments herein. Also, various improvements and modifications can be made to the herein-disclosed exemplary embodiments without departing from the spirit and scope of the present invention.

The system and method according to the inventive principles herein are necessarily not dependent upon the precise exemplary hardware or software architecture disclosed herein.

What is claimed is:

1. A computer system for searching a database, comprising:
   an input section responsive to user entry of a user query;
   an expansion section responsive to the input section, for expanding the user query to include synonyms of action words and object words in the user query, wherein the expansion section interacts with an action dictionary of synonyms that includes a list of "verb-noun" expressions that are synonymous with other verbs;
   a validation section responsive to said expansion section, and arranged for interaction with a subject-action-object knowledge database (SAO KB) containing fields with subjects, actions, objects, for selecting only those queries having corresponding expressions in the SAO KB; and
   an output section for transmitting the selected queries for searching in the database.

2. A computer system as in claim 1, wherein said entry section includes an analysis portion for separating actions from objects.

3. A computer system as in claim 1, wherein said validating section includes an output portion for outputting validated results and rejecting non-validated results.

4. A computer system of claim 1, wherein said action dictionary of synonyms further includes:
   a list of verbs with similar sense;
   a list of "verbA" including the verbs—perform, carry out, realize, and other verbs with similar sense;
   a list of "verb—relevant verbal nouns";
   a list of "verbsB" including the verbs—produce, create, form, and other verbs with similar sense; and
   a list of "participle2" words including "verb—relevant participle".

5. A computer system as in claim 4, wherein said expansion section includes an action expansion portion responsive to said action dictionary of synonyms and to an action word for forming:
   a list of verbs relevant to an action;
   a list of "verbsA-verbal noun" expressions relevant to an action;
   a list of "verbsB-partciple2" expressions relevant to an action;
   a list of "verb-noun" expressions relevant to an action.

6. A computer system as in claim 5, wherein said expansion section interacts with a dictionary of object synonyms, said expansion section interacts with a dictionary of object synonyms, said action dictionary of object synonyms containing groups of objects having similar sense and an object expression portion to form lists of expressions synonymous from an object and the dictionary of objects synonyms, and said validation section includes the fields; subjects, actions, objects, and "main parts of objects" and classifies the query on the basis of the fields in response to the expansion section an din response to the SAO KB.

7. A computer system as in claim 1, wherein said expansion section interacts with a dictionary of object synonyms.

8. A computer system as in claim 1, wherein said expansion section interacts with a dictionary of object synonyms, said dictionary of object synonyms containing groups of objects having similar sense and an object expression portion to form lists of expressions synonymous from an object and the dictionary of objects synonyms.

9. A computer system as in claim 1, wherein said validation section includes the fields: subjects, actions, objects, and "main parts of objects" and classifies the query on the basis of the fields in response to the expansion section and in response to the SAO KB.

10. A system as in claim 1, wherein said SAO KB contains data prepared from texts in a discipline corresponding to the discipline of the query.

11. A method as in claim 1, wherein said SAO contains data prepared from texts in a discipline corresponding to the discipline of the query.

12. A system as in claim 1, wherein said SAO KB contains only data prepared from texts in a discipline corresponding to the discipline of the query.

13. A method as in claim 1, wherein said SAO contains only data prepared from texts in a discipline corresponding to the discipline of the query.

14. A method for composing a computer search, comprising:
   expanding a user query with action synonyms and with object synonyms to obtain expanded queries, wherein expanding includes interacting with an action dictionary of synonyms that includes a list of "verb-noun" expressions that are synonymous with other verbs;
   obtaining results and validating the results obtained from the expanded queries by comparing the expanded queries with a subject-action-object knowledge database (SAO KB) containing fields with subjects, actions, objects, so as to validate only expanded queries having corresponding expressions in the SAO KB;
   outputting validated results to obtain search results.

15. A method as in claim 14, wherein said processing an entry includes separating actions from objects.

16. A method as in claim 14, wherein said validating step includes outputting validated results and rejecting non-validated results.

17. A method as in claim 14, wherein said action dictionary of synonyms further includes:
   a list of verbs with similar sense;
   a list of "verbsA" including the verbs—perform, carry out, realize, and other verbs with similar sense;
   a list of "verb—relevant verbal nouns";
   a list of "verbsB" including the verbs—produce, create, form, and other verbs with similar sense; and
   a list of "participle2" words including "verb—relevant participles".

18. A method as in claim 17, wherein said expanding step includes an action expansion responsive to said action dictionary of synonyms and to an action word for forming:
   a list of verbs relevant to an action;
   a list of "verbsA-verbal noun" expressions relevant to an action;
   a list of "verbsB-participle2" expressions relevant to an action;
   a list of "verb-noun" expressions relevant to an action.

19. A method as in claim 18, wherein said expanding step includes interacting with a dictionary of object synonyms, said dictionary of object synonyms containing groups of objects having similar sense and an object expression portion to form lists of expressions synonymous from an object and the dictionary of objects synonyms, and said validation step includes generating the fields: subjects, actions, objects, and "main parts of objects" and classifying the query on the basis of the fields in response to the expanding step and in response to the SAO KB.

20. A method as in claim 14, wherein said expanding step includes interacting with a dictionary of object synonyms.

21. A method as in claim 14, wherein said expanding step includes interacting with a dictionary of object synonyms, said dictionary of object synonyms containing groups of objects having similar sense, and an said expanding step includes forming object expression synonyms from an object and the dictionary of object synonyms.

22. A method as in claim 14, wherein said validation step includes generating the fields: subjects, actions, objects, and "main parts of objects" and classifying the query on the basis of the fields in response to the expanding step and in response to the SAO KB.

* * * * *